Figure 1:
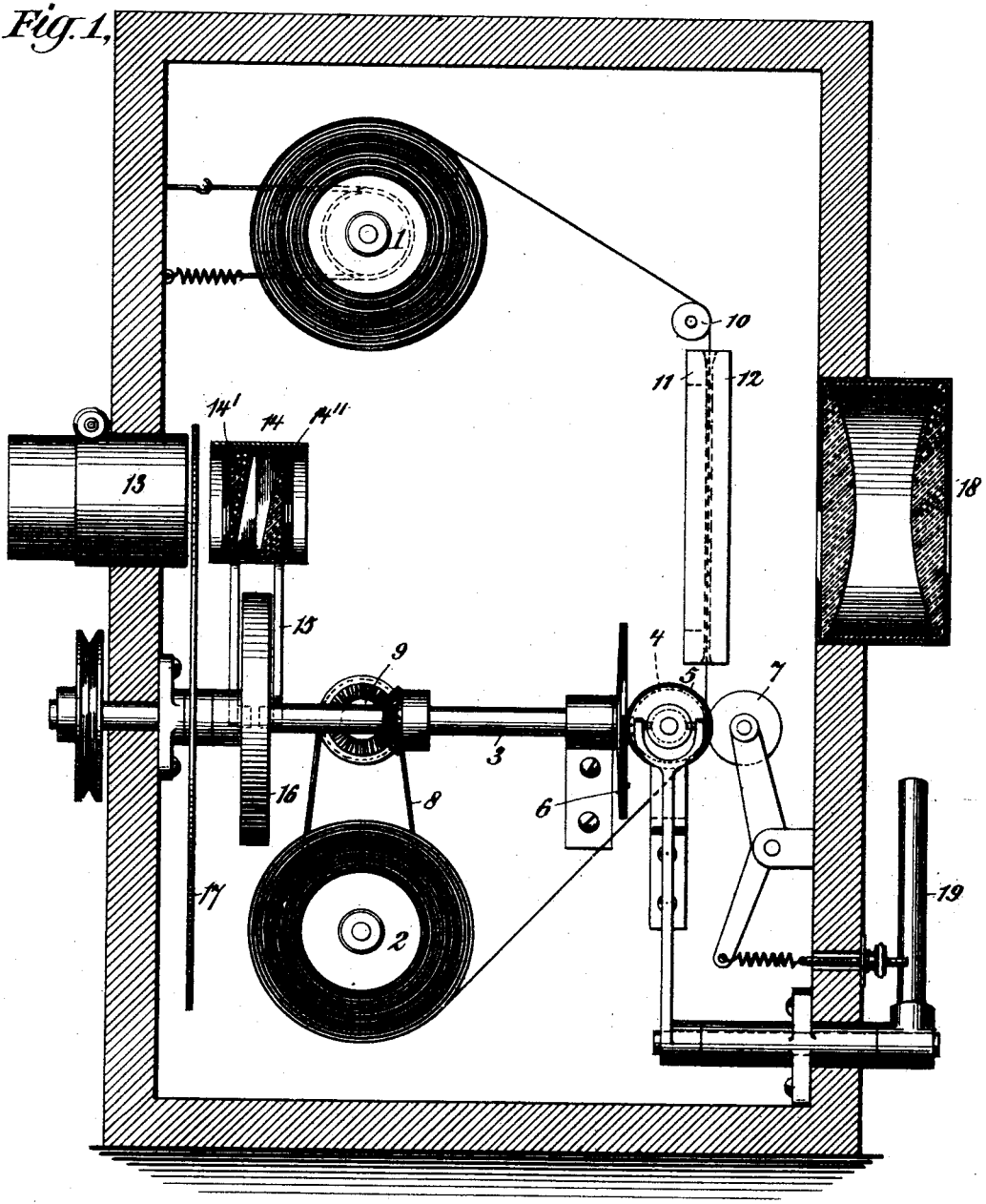

No. 695,916. Patented Mar. 25, 1902.
W. K.-L. DICKSON.
CONSECUTIVE VIEW APPARATUS.
(Application filed Oct. 22, 1898.)
(No Model.) 2 Sheets—Sheet 1.

WITNESSES:
INVENTOR
BY
ATTORNEYS

No. 695,916. Patented Mar. 25, 1902.
W. K.-L. DICKSON.
CONSECUTIVE VIEW APPARATUS.
(Application filed Oct. 22, 1898.)

(No Model.) 2 Sheets—Sheet 2.

WITNESSES:

INVENTOR

BY

ATTORNEYS

THE NORRIS PETERS CO., PHOTO-LITHO., WASHINGTON, D. C.

United States Patent Office.

WILLIAM KENNEDY-LAURIE DICKSON, OF LONDON, ENGLAND, ASSIGNOR TO THE AMERICAN MUTOSCOPE COMPANY, OF NEW YORK, N. Y., A CORPORATION OF NEW JERSEY.

CONSECUTIVE-VIEW APPARATUS.

SPECIFICATION forming part of Letters Patent No. 695,916, dated March 25, 1902.

Application filed October 22, 1898. Serial No. 694,260. (No model.)

*To all whom it may concern:*

Be it known that I, WILLIAM KENNEDY-LAURIE DICKSON, a subject of the Queen of Great Britain, residing at London, England, have invented certain new and useful Improvements in Consecutive-View Apparatus; and I do hereby declare the following to be a full, clear, and exact description of the invention, such as will enable others skilled in the art to which it appertains to make and use the same.

My invention relates to moving-picture or consecutive-view apparatus; and it consists in the use in connection with mechanism for feeding a film, picture-strip, or other view-carrier through a field of view, illumination, or exposure of a prism of variable angle, consisting of two prisms revolubly mounted and located in the optical axis and mechanism for vibrating said prisms in such manner that although the film or other view-carrier is moving constantly through the field of the apparatus it is held optically stationary at intervals with respect to the lens or point of view. The effect of an intermittently-moving view-carrier which is stationary during the periods of exposure is thus obtained without the disadvantages incident to intermittent or irregular movement of the view-carrier, such as vibration of the view-carrier and apparatus, producing indistinctness of the picture and, if the view-carrier be a film or picture-strip, strain upon and wear of such strip; and my invention further consists in the novel combination, construction, and arrangement of the parts of the apparatus.

The objects of my invention are to improve and simplify that type of consecutive-view apparatus in which the film or view-carrier moves continuously and in which means are employed for causing the rays of light to move in accordance with the movement of the view-carrier during the intervals of exposure or illumination, so that during such intervals the film or view-carrier although moving continuously is optically stationary with reference to the lens or the point of view, and also to make the apparatus as simple and compact as possible, not liable to derangement, and easily operated. These objects are attained in the invention herein described, and illustrated in the drawings which accompany and form a part of this specification, in which the same reference-numerals indicate the same or corresponding parts, and in which—

Figure 2:
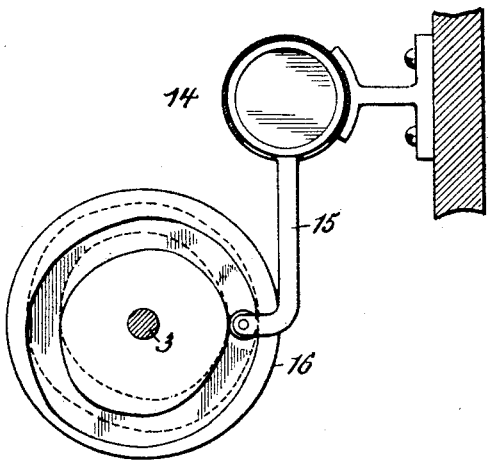

Figure 1 is a side elevation of the mechanism of the apparatus, the inclosing case being sectioned; and Fig. 2 is a detail view looking from the right of Fig. 1 of the prism of variable angle, the cam, and the connections by which the sections of said prism are vibrated as the cam revolves.

The apparatus shown in the drawings is adapted for the use of a long flexible film as a view-carrier; but other types of view-carriers may be used instead.

The apparatus shown is a projecting apparatus, (the lantern being omitted;) but the same mechanism may be used in a camera or in a direct-vision-reproducing apparatus.

In the drawings, 1 indicates a supply-reel, and 2 a winding-up reel.

3 is a driving-shaft.

4 is a feeding-roller driven from the shaft 3 by a friction-wheel 5 and friction-disk 6, the former being radially movable with respect to the latter, so that the rate at which the film is fed may be varied.

7 is an idler-roller which holds the film against the feeding-roller 4.

The winding-up reel 2 is driven by a belt 8, deriving its motion from a shaft 9, driven by gearing from the driving-shaft 3.

10 is a guide-roller for the film, and 11 and 12 are guide-frames between which the film passes.

13 is the objective lens of the projecting apparatus. In rear of this lens is a prism of variable angle 14, suitably supported and consisting of two parts 14' and 14", each of which is a prism. The two parts 14' and 14" are mounted to rotate about the optical axis and are provided with downwardly-extending fingers 15, the ends of which enter cam-grooves in a cam 16, mounted on the main driving-shaft 3. When this shaft rotates, therefore, the prisms 14' and 14" oscillate back and forth in opposite directions through arcs of circles, the effect of this being to alternately increase and decrease the angle between their adjacent surfaces. The "angle" of a prism of this character, composed of two separate parts the outer surfaces of which are parallel, is the angle between the inner surfaces of the two parts of the prism, and the effect produced by such a prism is the same as though the prism were composed of but one part the angle between the sides of which is the same as the angle between the adjacent surfaces of the parts of the composite prism.

The effect of the variation in angle of the prism 14 produced by the relative motion of the parts 14' and 14" is to deflect the rays of light in such manner as to compensate for the movement of the film during the intervals of exposure, holding the pictures thereon optically stationary with reference to the lens 13 during such intervals of exposure, notwithstanding the movement of the film.

17 is a shutter-disk upon the driving-shaft 3.

18 is a condensing-lens.

19 is a shifting-lever, by which the radial position of the friction-wheel 5 with reference to the friction-disk 6 may be varied for the purpose of compensating for slipping or shrinkage of the film.

In the operation of the apparatus as the shaft 3 rotates the film is fed downward from the reel 1 and wound upon the reel 2, the belt 8 slipping to compensate for the gradually-increasing diameter of the winding-up reel. As the shaft 3 rotates the prisms 14' and 14" vibrate through arcs of circles in opposite directions, thus varying the angle of prism 14 and deflecting the optical axis and the rays of light upward and downward alternately. During the upward movement of the optical axis the light is shut off from the lens 13; but during the downward movement, which is in the direction of motion of and at the same speed as the movement of the film, the shutter is open.

I do not limit myself to the details of construction and arrangement of the apparatus illustrated.

Having thus completely described my invention, what I claim, and desire to secure by Letters Patent, is—

1. In a consecutive-view apparatus, the combination, with means for feeding a view-carrier through the field of the apparatus, of two prisms revolubly mounted and together constituting a prism of variable angle, and means for vibrating said prisms about their centers of rotation.

2. In a consecutive-view apparatus, the combination, with means for feeding a view-carrier through the field of the apparatus, of two prisms revolubly mounted and together constituting a prism of variable angle, and means for vibrating said prisms in opposite directions about their centers of rotation.

3. In a consecutive-view apparatus, the combination, with a main driving-shaft, and mechanism for feeding a view-carrier through the field of the apparatus, driven from said shaft, of two prisms revolubly mounted and together constituting a prism of variable angle, a cam deriving its motion from said driving-shaft, and means operated by said cam for vibrating said prisms about their centers of rotation.

In testimony whereof I affix my signature in the presence of two witnesses.

WILLIAM KENNEDY-LAURIE DICKSON.

Witnesses:
H. D. JAMESON,
F. L. RANDS.